(12) United States Patent
Jung et al.

(10) Patent No.: US 11,805,497 B2
(45) Date of Patent: Oct. 31, 2023

(54) METHOD AND APPARATUS FOR UPLINK TRANSMISSION USING MIMO IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/991,132

(22) Filed: Aug. 12, 2020

(65) Prior Publication Data
US 2021/0051632 A1 Feb. 18, 2021

(30) Foreign Application Priority Data
Aug. 14, 2019 (KR) ........................ 10-2019-0099835

(51) Int. Cl.
*H04W 72/04* (2023.01)
*H04W 76/27* (2018.01)
*H04B 7/0413* (2017.01)

(52) U.S. Cl.
CPC .......... *H04W 72/04* (2013.01); *H04B 7/0413* (2013.01); *H04W 76/27* (2018.02)

(58) Field of Classification Search
CPC . H04W 72/04; H04W 76/27; H04W 72/1242; H04W 72/14; H04B 7/0413; H04L 5/0044; H04L 5/0053; H04L 5/0064
See application file for complete search history.

(56) References Cited

U.S. PATENT DOCUMENTS

| 10,340,992 | B2 | 7/2019 | Suzuki et al. |
| 10,616,871 | B2 | 4/2020 | Hong et al. |
| 10,862,556 | B2 | 12/2020 | Suzuki et al. |

(Continued)

FOREIGN PATENT DOCUMENTS

| CN | 107710805 A | 2/2018 |
| CN | 108886446 A | 11/2018 |

(Continued)

OTHER PUBLICATIONS

WO 2017/165668 A1 (Year: 2017).*

(Continued)

*Primary Examiner* — Rushil Parimal Sampat
(74) *Attorney, Agent, or Firm* — Jefferson IP Law, LLP

(57) ABSTRACT

A method of a terminal in a wireless communication system is provided. The terminal includes receiving, from a base station, configuration information for a first uplink and configuration information for a second uplink, determining a first maximum number of multi-input and multi-output (MIMO) layers for the first uplink, based on the configuration information for the first uplink, determining a maximum number of layers for a physical uplink shared channel (PUSCH) supported by the terminal to be a second maximum number of MIMO layers for the second uplink, and transmitting, to the base station, the PUSCH by using at least one of the first uplink or the second uplink, based on the determined first maximum number of MIMO layers and the second maximum number of MIMO layers.

8 Claims, 16 Drawing Sheets

(56) References Cited

U.S. PATENT DOCUMENTS

| | | | |
|---|---|---|---|
| 2014/0369308 A1 | 12/2014 | Gerstenberger et al. | |
| 2017/0201968 A1 | 7/2017 | Nam et al. | |
| 2018/0091197 A1* | 3/2018 | Huang | H04B 7/0456 |
| 2018/0183503 A1 | 6/2018 | Rahman et al. | |
| 2019/0037586 A1* | 1/2019 | Park | H04L 1/0031 |
| 2019/0230683 A1* | 7/2019 | Akkarakaran | H04L 5/0064 |
| 2019/0373559 A1* | 12/2019 | Davydov | H04W 52/146 |

FOREIGN PATENT DOCUMENTS

| | | |
|---|---|---|
| CN | 109076385 A | 12/2018 |
| EP | 2 624 473 A2 | 8/2013 |
| WO | 2018/084971 A1 | 5/2018 |

OTHER PUBLICATIONS

Huawei et al., 'Correction on DCI size alignment in TS 38.212', R1-1905744, 3GPP TSG RAN WG1 Meeting #96bis, Xi'an, China, Apr. 10, 2019.

'3GPP; TSG RAN; NR; NR and NG-RAN Overall Description; Stage 2 (Release 15)', 3GPP TS 38.300 V15.6.0, Jun. 28, 2019.

'3GPP; TSG RAN; NR; UE radio access capabilities (Release 15)', 3GPP TS 38.306 V15.6.0, Jun. 29, 2019.

'3GPP; TSG RAN; NR; RRC protocol specification (Release 15)', 3GPP TS 38.331 V15.6.0, Jun. 29, 2019.

International Search Report dated Nov. 20, 2020, issued in International Patent Application No. PCT/KR2020/010647.

Qualcomm Inc; BWP based dynamic adaptation of MIMO configuration; 3GPP TSG-RAN WG2 Meeting #106; R2-1906710; Resubmission of R2-1903054; May 13-17, 2019; Reno, USA.

Huawei et al.; Corrections on maxMIMO-Layers in PDSCH-ServingCellConfig and PUSCH-ServingCellConfig; 3GPP TSG-RAN WG2 Meeting #105; R2-1901992; Feb. 25-Mar. 1, 2019; Athens, Greece.

Samsung Electronics; maxMIMO-Layers for the normal uplink and the supplementary uplink_Option 2; 3GPP TSG-RAN2 WG2 Meeting #107; R2-1911342; Aug. 26-30, 2019; Prague, Czech Republic.

Ericsson; MIMO layers configuration per BWP; 3GPP TSG-RAN WG1 Meeting#98bis; Tdoc R1-1911011; Oct. 14-20, 2019; Chongqing, China.

Extended European Search Report dated Aug. 1, 2022; European Appln. No. 20853209.3-1206/3994943 PCT/KR2020010647.

Chinese Office Action dated Jun. 7, 2023, issued in Chinese Patent Application No. 202080057525.2.

* cited by examiner

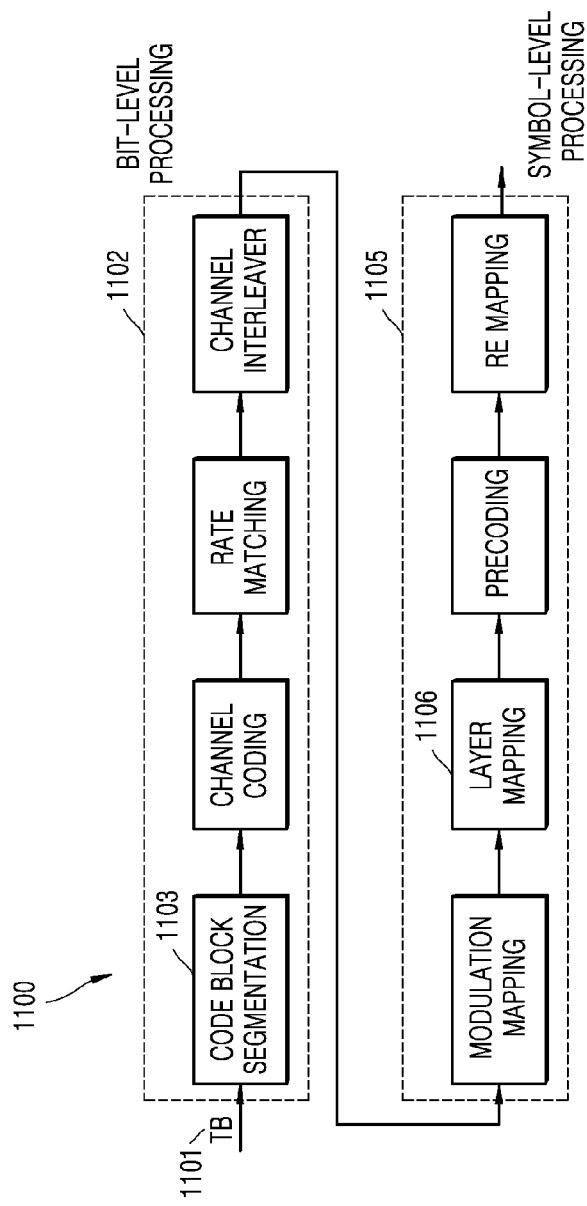

METHOD AND APPARATUS FOR UPLINK TRANSMISSION USING MIMO IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0099835, filed on Aug. 14, 2019, in the Korean Intellectual Property Office, the disclosure of which is incorporated by reference herein in its entirety.

BACKGROUND

1. Field

The disclosure relates to methods and apparatuses for configuring Multi Input Multi Output (MIMO) for supporting an uplink in a mobile communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, the implementation of 5G communication systems in an ultra-high-frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of the cloud RAN as the above-described big data processing technology may be an example of convergence of 5G communication technology and IoT technology.

As various services may be provided according to the foregoing and the development of mobile communication systems, methods for smoothly providing such services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provided apparatuses and methods capable of effectively providing services in mobile communication systems.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method includes receiving, from a base station, configuration information for a first uplink and configuration information for a second uplink, determining a first maximum number of multi-input and multi-output (MIMO) layers for the first uplink, based on the configuration information for the first uplink, determining a maximum number of layers for a physical uplink shared channel (PUSCH) supported by the terminal to be a second maximum number of MIMO layers for the second uplink, and transmitting, to the base station, the PUSCH by using at least one of the first uplink or the second uplink, based on the determined first maximum number of MIMO layers and the second maximum number of MIMO layers.

In accordance with another aspect of the disclosure, a terminal in a wireless communication system is provided. The terminal includes a transceiver, and at least one controller configured to receive, from a base station, configuration information for a first uplink and configuration information for a second uplink, determine a first maximum number of multi-input and multi-output (MIMO) layers for the first uplink, based on the configuration information for the first uplink, determine a maximum number of layers for a physical uplink shared channel (PUSCH) supported by the terminal to be a second maximum number of MIMO layers for the second uplink, and transmit, to the base station, the PUSCH by using at least one of the first uplink or the second uplink, based on the determined first maximum number of MIMO layers and the second maximum number of MIMO layers.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1O is a diagram illustrating an example of wireless transmission and reception paths according to an embodiment of the disclosure; and FIG. 1P is a diagram illustrating an example embodiment for a bit-level and a symbol-level processing of a terminal or a base station according to an embodiment of the disclosure.

Throughout the drawings, like reference numerals will be understood to refer to like parts, components, and structures.

DETAILED DESCRIPTION

Figure 1A:
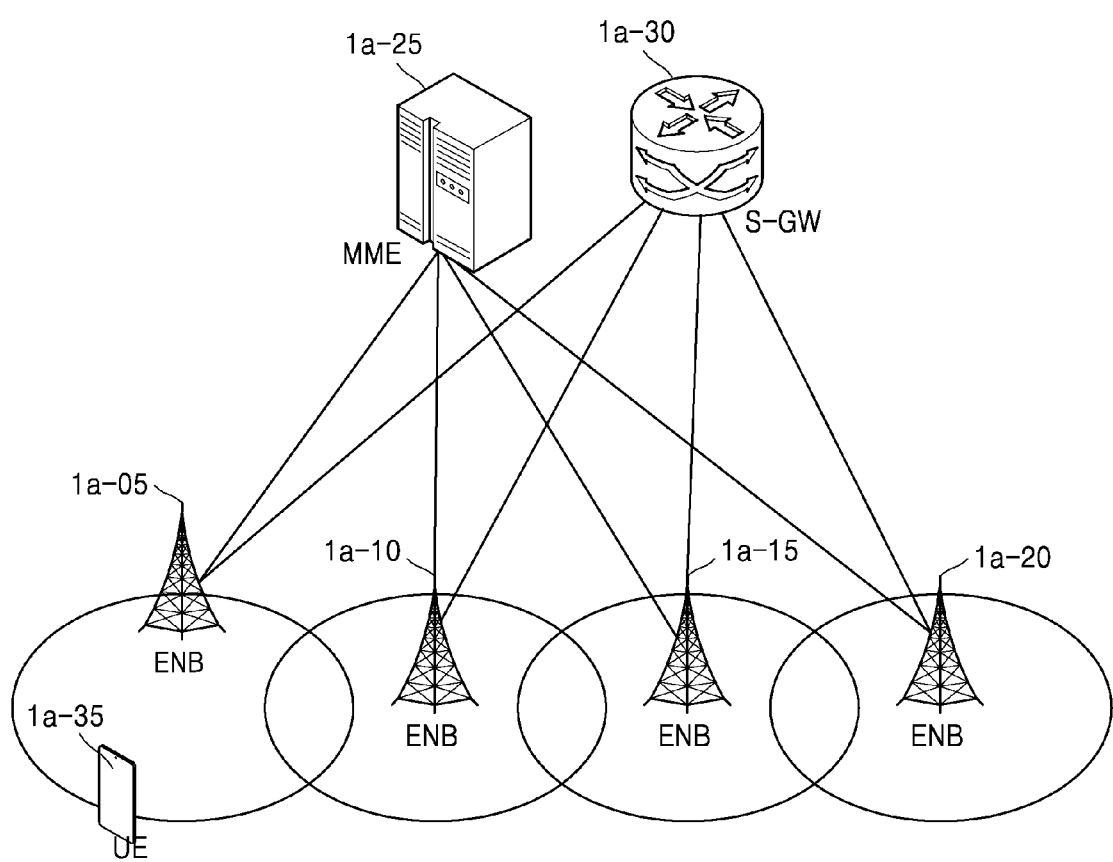
FIG. 1A is a diagram illustrating a structure of a Long Term Evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, and the like.

In the disclosure, a controller may also be referred to as a processor.

Throughout the specification, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~unit" used in the embodiments may refer to a software component or a hardware component such as a field programmable gate array (FPGA) or an application specific integrated circuit (ASIC) and the "~unit" may perform certain functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units". In addition, the components and "~units" may be implemented to operate one or more central processing units (CPUs) in a device or a security multimedia card. Also, in embodiments, the "~unit" may include one or more processors.

In the disclosure, a downlink (DL) may mean a wireless transmission path of a signal transmitted from a base station to a terminal, and an uplink (UL) may mean a wireless transmission path of a signal transmitted from a terminal to a base station. Also, hereinafter, a Long Term Evolution (LTE) or LTE-A system may be described as an example; however, embodiments of the disclosure may also be applied to other communication systems having similar technical backgrounds or channel types. For example, 5th generation mobile communication technology (5G) (or New Radio (NR)) developed after LTE-A may be included in systems to which embodiments of the disclosure may be applied, and the following 5G may be a concept including the existing LTE, LTE-A, and other similar services. Also, the disclosure may also be applied to other communication systems through some modifications without departing from the scope of the disclosure by the judgment of those of ordinary skill in the art.

In the following description, terms for identifying access nodes, terms referring to network entities, terms referring to messages, terms referring to interfaces between network entities, terms referring to various identification information, and the like are used for convenience of description. Thus, the disclosure is not limited to the terms described below and other terms referring to objects having equivalent technical meanings may be used.

In the following description, terms and names defined in the $3^{rd}$ Generation Partnership Project Long Term Evolution (3GPP LTE) standards may be used for convenience of description. However, the disclosure is not limited to those terms and names and may also be similarly applied to systems according to other standards.

Hereinafter, a base station may be an agent performing terminal resource allocation and may be at least one of a gNode B, an eNode B, a Node B, a base station (BS), a radio access unit, a base station controller, or a node on a network. Examples of a terminal may include a user equipment (UE), a mobile station (MS), a cellular phone, a smartphone, a computer, or a multimedia system capable of performing a communication function. However, the disclosure is not limited thereto.

Particularly, the disclosure may be applied to 3GPP NR (5G mobile communication standards). Also, the disclosure is applicable to intelligent services (e.g., smart home, smart building, smart city, smart car or connected car, health care, digital education, retail, security, and safety services) based on 5G communication technology and IoT technology. In the disclosure, eNB may be used mixed with gNB for convenience of description. That is, a base station described as an eNB may represent a gNB. Also, the term "terminal" may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication system, an LTE system uses Orthogonal Frequency Division Multiplexing (OFDM) in a downlink (DL) and uses Single Carrier-Frequency Division Multiple Access (SC-FDMA) in an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to an embodiment of the disclosure, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved Multi Input Multi Output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km$^2$) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the disclosure is applied are not limited thereto.

Also, although embodiments of the disclosure will be described below by using an LTE, LTE-A, LTE Pro, or 5G (or NR, next-generation mobile communication) as an example, the embodiments of the disclosure may also be applied to other communication systems having similar technical backgrounds or channel types. Also, the embodiments of the disclosure may also be applied to other communication systems through some modifications without departing from the scope of the disclosure by the judgment of those of ordinary skill in the art.

In the following description of the disclosure, detailed descriptions of well-known functions or configurations will be omitted because they would unnecessarily obscure the subject matters of the disclosure. Hereinafter, embodiments of the disclosure will be described with reference to the accompanying drawings.

FIG. 1A is a diagram illustrating a structure of an LTE system according to an embodiment of the disclosure.

Referring to FIG. 1A, a radio access network of the LTE system may include next-generation base stations (e.g., evolved Node Bs (eNBs), Node Bs, or base stations) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the eNBs 1a-05 to 1a-20 and the S-GW 1a-30.

In FIG. 1A, the eNBs 1a-05 to 1a-20 may correspond to the existing Node Bs of a Universal Mobile Telecommunication System (UMTS) system. The eNB may be connected to the UE 1a-35 through a wireless channel and may perform a more complex function than the existing Node B. In the LTE system, all user traffic including real-time services such as Voice over IP (VoIP) through the Internet protocol may be serviced on a shared channel Thus, a device for collecting and scheduling state information such as the buffer states of UEs, available transmission power states, and channel states may be required, which may be performed by the ENBs 1a-05 to 1a-20.

One eNB may generally control a plurality of cells. For example, in order to implement a transmission rate of 100 Mbps, the LTE system may use Orthogonal Frequency Division Multiplexing (OFDM) as a radio access technology in a 20 MHz bandwidth. Also, an adaptive modulation & coding (AMC) scheme may be applied to determine a modulation scheme and a channel coding rate according to the channel state of a terminal. The S-GW 1a-30 may be an apparatus for providing a data bearer and may generate or remove a data bearer under the control of the MME 1a-25. The MME may be an apparatus for performing various control functions as well as a mobility management function for a terminal and may be connected to a plurality of base stations.

Figure 1B:
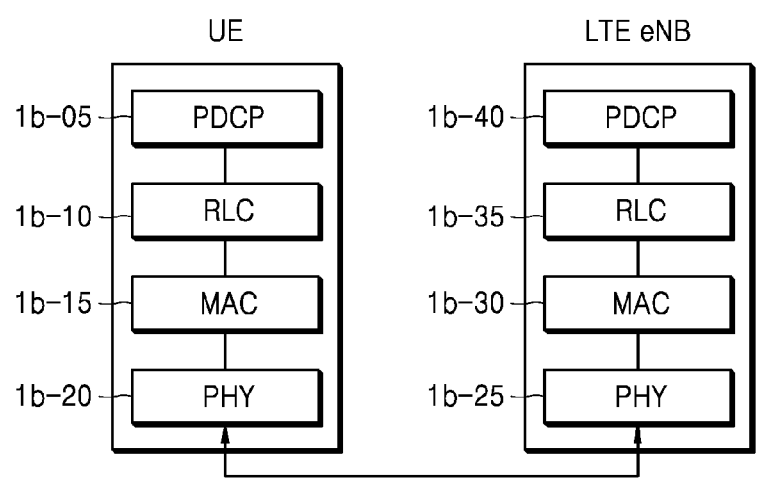
FIG. 1B is a diagram illustrating a radio protocol architecture in an LTE system according to an embodiment of the disclosure.

FIG. 1B is a diagram illustrating a radio protocol architecture in an LTE system according to an embodiment of the disclosure.

Referring to FIG. 1B, the radio protocol of the LTE system may include a Packet Data Convergence Protocol (PDCP) 1b-05 and 1b-40, a Radio Link Control (RLC) 1b-10 and 1b-35, and a Medium Access Control (MAC) 1b-15 and 1b-30 in each of a terminal and an eNB. The PDCP may perform operations such as IP header compression/decompression. The main functions of the PDCP may be summarized as follows.

- Header compression and decompression function (Header compression and decompression: ROHC only)
- User data transmission function (Transfer of user data)
- Sequential transmission function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLC 1b-10 and 1b-35 may reconfigure a PDCP packet data unit (PDU) in a suitable size to perform an ARQ operation and the like. The main functions of the RLC may be summarized as follows.

Data transmission function (Transfer of upper layer PDUs)

ARQ function (Error Correction through ARQ (only for AM data transfer))

Concatenation, segmentation, and reassembly function (Concatenation, segmentation, and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MAC 1b-15 and 1b-30 may be connected to several RLC layers configured in one terminal and may perform an operation of multiplexing RLC PDUs into MAC PDUs and demultiplexing RLC PDUs from MAC PDUs. The main functions of the MAC may be summarized as follows.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 1b-20 and 1b-25 may channel-code and modulate upper layer data, generate OFDM symbols, and transmit the same through wireless channels or may demodulate and channel-decode OFDM symbols received through wireless channels and transmit the result thereof to the upper layer.

Figure 1C:
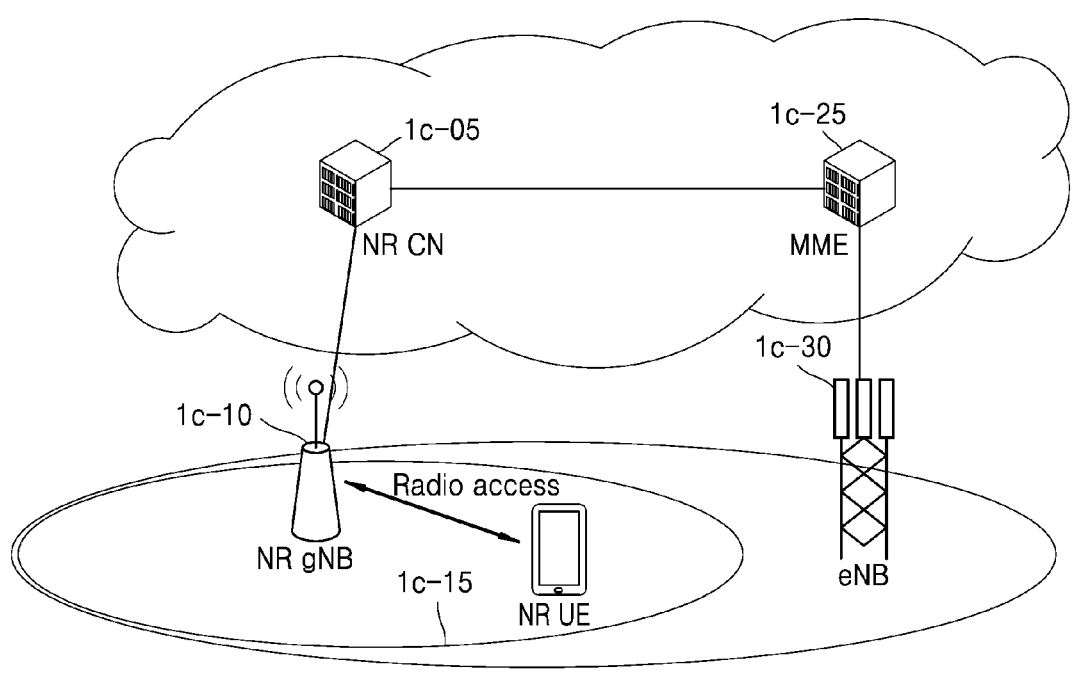
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, a radio access network of the next-generation mobile communication system (hereinafter NR or 5G) may include a next-generation base station (New Radio Node B) (hereinafter NR gNB or NR base station) 1c-10 and a next-generation radio core network (New Radio Core (NR CN)) 1c-05. A next-generation radio user terminal (New Radio User Equipment (NR UE) or terminal) 1c-15 may access an external network through the NR gNB 1c-10 and the NR CN 1c-05.

Referring again to FIG. 1C, the NR gNB 1c-10 may correspond to an evolved Node B (eNB) of the existing LTE system. The NR gNB may be connected to the NR UE 1c-15 through a wireless channel and may provide a better service than the existing Node B. In the next generation mobile communication system, all user traffic may be serviced on a shared channel Thus, a device for collecting and scheduling state information such as the buffer states of UEs, available transmission power states, and channel states may be required, which may be performed by the NR gNB 1c-10. One NR gNB may generally control a plurality of cells. In the next-generation mobile communication system, a bandwidth larger than or equal to the current maximum bandwidth may be applied to implement ultra-high-speed data transmission compared to the current LTE. Also, a beamforming technology may be additionally combined by using Orthogonal Frequency Division Multiplexing (OFDM) as a radio access technology. Also, an adaptive modulation & coding (AMC) scheme may be applied to determine a modulation scheme and a channel coding rate according to the channel state of a terminal.

The NR CN 1c-05 may perform functions such as mobility support, bearer configuration, and Quality of Service (QoS) configuration. The NR CN may be an apparatus for performing various control functions as well as a mobility management function for a terminal and may be connected to a plurality of base stations. Also, the next-generation mobile communication system may also be linked with the existing LTE system, and the NR CN may be connected to an MME 1c-25 through a network interface. The MME may be connected to an eNB 1c-30 that is an existing base station.

Figure 1D:
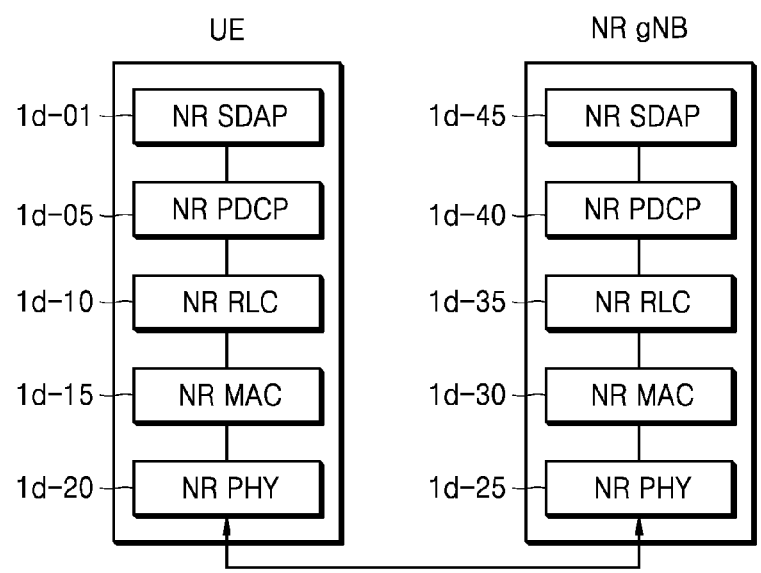
FIG. 1D is a diagram illustrating a radio protocol architecture of a next-generation mobile communication system according to an embodiment of the disclosure.

FIG. 1D is a diagram illustrating a radio protocol architecture of a next-generation mobile communication system according to an embodiment of the disclosure.

Referring to FIG. 1D, the radio protocol of the next-generation mobile communication system may include NR Service Data Adaptation Protocol (SDAP) 1d-01 and 1d-45, NR PDCP 1d-05 and 1d-40, NR RLC 1d-10 and 1d-35, NR MAC 1d-15 and 1d-30, and NR PHY 1d-20 and 1d-25 in each of a terminal and an NR base station.

The main functions of the NR SDAP 1d-01 and 1d-45 may include some of the following functions.

User data transmission function (Transfer of user plane data)

Function of mapping between QoS flow and data bearer for uplink and downlink (Mapping between a QoS flow and a DRB for both DL and UL)

Function of marking QoS flow ID for uplink and downlink (Marking QoS flow ID in both DL and UL packets)

Function of mapping reflective QoS flow to data bearer for uplink SDAP PDUs (Reflective QoS flow to DRB mapping for the UL SDAP PDUs)

As for an SDAP layer, the terminal may be configured with a Radio Resource Control (RRC) message for each PDCP layer, for each bearer, or for each logical channel whether to use a header of the SDAP layer or whether to use a function of the SDAP layer. When an SDAP header is configured, the terminal may be indicated by a non-access stratum (NAS) Quality of Service (QoS) reflection configuration 1-bit indicator (NAS reflective QoS) and an access stratum (AS) QoS reflection configuration 1-bit indicator (AS reflective QoS) of the SDAP header to update or reconfigure mapping information between a data bearer and a QoS flow of the uplink and the downlink. The SDAP header may include QoS flow ID information representing the QoS. The QoS information may be used as data processing priority and scheduling information or the like to support a smooth service.

The main functions of the NR PDCP 1d-05 and 1d-40 may include some of the following functions.

- Header compression and decompression function (Header compression and decompression: ROHC only)
- User data transmission function (Transfer of user data)
- Sequential transmission function (In-sequence delivery of upper layer PDUs)
- Non-sequential transmission function (Out-of-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink)

In the above, the reordering function of the NR PDCP entity may mean a function of reordering the PDCP PDUs received from the lower layer in order based on a PDCP sequence number (SN). The reordering function of the NR PDCP entity may include a function of transmitting data to the upper layer in the reordered order, may include a function of directly transmitting data without considering the order, may include a function of rearranging the order and recording the missing PDCP PDUs, may include a function of reporting the state of the missing PDCP PDUs to the transmitting side, and may include a function of requesting retransmission of the missing PDCP PDUs.

The main functions of the NR RLC 1d-10 and 1d-35 may include some of the following functions.

- Data transmission function (Transfer of upper layer PDUs)
- Sequential transmission function (In-sequence delivery of upper layer PDUs)
- Non-sequential transmission function (Out-of-sequence delivery of upper layer PDUs)
- ARQ function (Error correction through ARQ)
- Concatenation, segmentation, and reassembly function (Concatenation, segmentation, and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above, the sequential transmission (in-sequence delivery) function of the NR RLC entity may mean a function of sequentially transmitting the RLC SDUs received from the lower layer to the upper layer. When one original RLC SDU is divided into multiple RLC SDUs and then received, the sequential transmission (in-sequence delivery) function of the NR RLC entity may include a function of reassembling and then transmitting the same. The sequential transmission (in-sequence delivery) function of the NR RLC entity may include a function of rearranging the received RLC PDUs based on the RLC sequence number (SN) or the sequence number (SN), may include a function of rearranging the order and recording the missing RLC PDUs, may include a function of reporting the state of the missing RLC PDUs to the transmitting side, and may include a function of requesting retransmission of the missing RLC PDUs.

The sequential transmission (in-sequence delivery) function of the NR RLC (1d-10 and 1d-35) entity may include a function of sequentially transmitting, when there is a missing RLC SDU, only the RLC SDUs up to before the missing RLC SDU to the upper layer. Also, the sequential transmission (in-sequence delivery) function of the NR RLC entity may include a function of sequentially transmitting all RLC SDUs received before the start of a timer to the upper layer, when a certain timer has expired even when there is a missing RLC SDU. Also, the sequential transmission (in-sequence delivery) function of the NR RLC entity may include a function of sequentially transmitting all RLC SDUs received up to now to the upper layer, when a certain timer has expired even when there is a missing RLC SDU.

The NR RLC (1d-10 and 1d-35) entity may process RLC PDUs in the order of receiving the RLC PDUs regardless of the order of the sequence number (out of sequence delivery) and transmit the results thereof to the NR PDCP (1d-05 and 1d-40) entity.

In the case of receiving segments, the NR RLC (1d-10 and 1d-35) entity may receive segments stored in a buffer or to be received afterward, reconfigure the segments into a single RLC PDU, and then transmit the same to the NR PDCP entity.

The NR RLC layer may not include the concatenation function, and this function may be performed in the NR MAC layer or may be replaced with the multiplexing function of the NR MAC layer.

In the above, the non-sequential transmission (out-of-sequence delivery) function of the NR RLC entity may mean a function of directly transmitting the RLC SDUs received from the lower layer to the upper layer regardless of the order thereof. When one original RLC SDU is divided into multiple RLC SDUs and then received, the non-sequential transmission (out-of-sequence delivery) function of the NR RLC entity may include a function of reassembling and then transmitting the same. The non-sequential transmission (out-of-sequence delivery) function of the NR RLC entity may include a function of storing the RLC SN or PDCP SN of the received RLC PDUs, arranging the order thereof, and recording the missing RLC PDUs.

The NR MAC 1d-15 and 1d-30 may be connected to multiple NR RLC entities configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information report function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)

Padding function (Padding)

The NR PHY layers (1b-20 and 1b-25) may channel-code and modulate upper layer data, generate OFDM symbols, and transmit the same through wireless channels or may demodulate and channel-decode OFDM symbols received through wireless channels and transmit the result thereof to the upper layer.

Figure 1E:
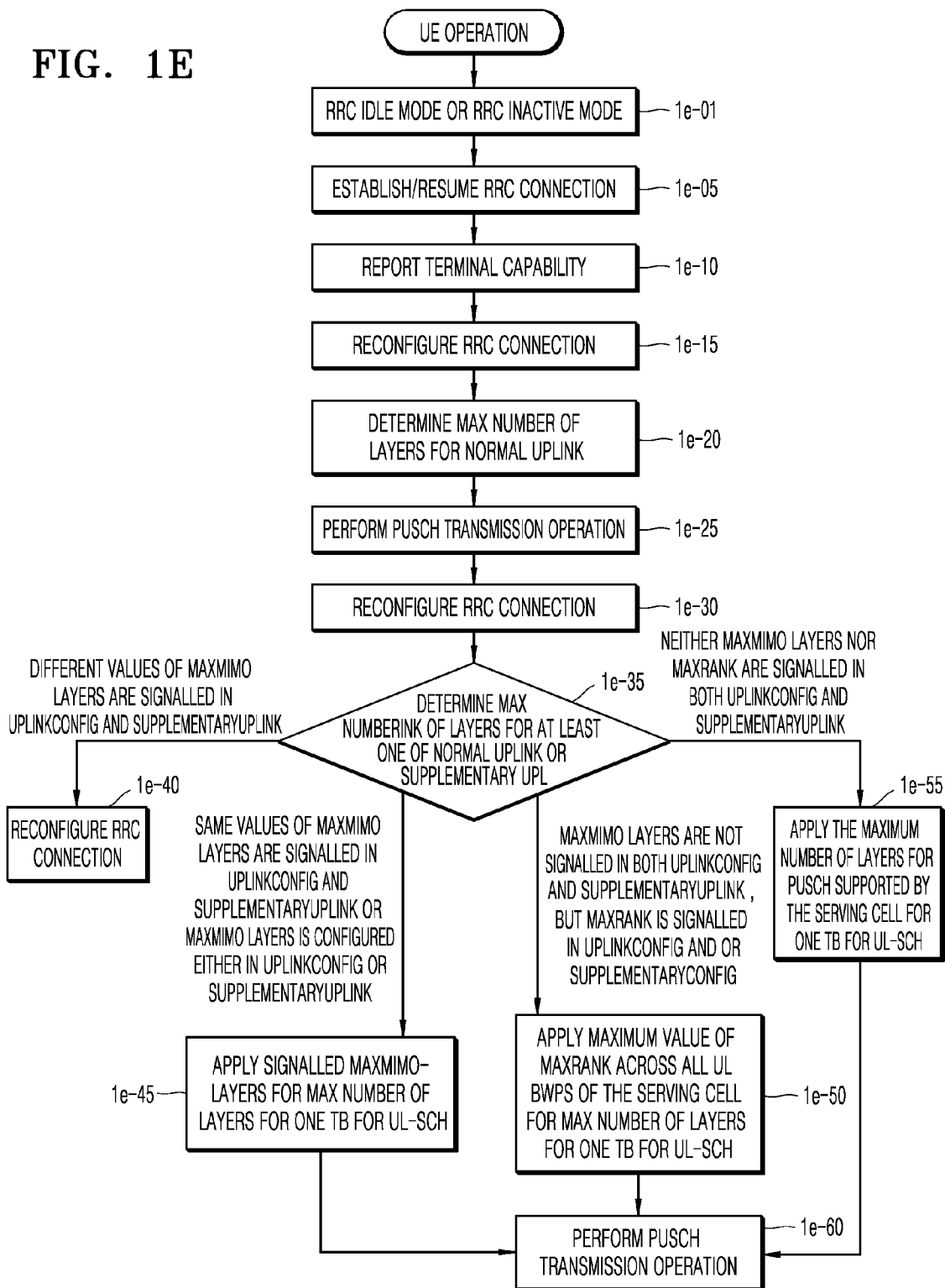
FIG. 1E is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1E is a diagram illustrating a terminal operation for a case where a terminal is configured with an uplink configuration (uplinkConfig) and an additional uplink configuration (supplementaryUplink) from a base station for one serving cell, according to an embodiment of the disclosure. According to various embodiments of the disclosure, at least one of the following operations may be omitted or modified in order to implement embodiments of the disclosure.

Referring to FIG. 1E, the terminal may be in an RRC idle mode or an RRC inactive mode (operation 1e-01).

In operation 1e-05, the terminal in the RRC idle mode or the RRC inactive mode may establish an RRC connection with the base station when data to be transmitted/received occurs. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1e-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for a RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a ue-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1e-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information for at least one UL uplink band width part (BWP) for the uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for the uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1e-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1e-25, the terminal may perform a physical uplink shared channel (PUSCH) transmission operation. For example, the terminal may perform a PUSCH transmission operation by determining a rate matching and a transport block size (TBS) size for PUSCH transmission in the UL BWP by applying the maximum number of layers determined in operation 1e-20.

According to an embodiment of the disclosure, when performing a limited buffer rate matching (LBRM), which limits the number of parity bits that may be transmitted among all parity bits generated by low density parity check (LDPC) coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing a full buffer rate matching (FBRM) for transmitting all parity bits generated by LDPC coding for a particular input, the terminal may determine the TBS size by performing a rate matching based on the number of layers configured for each BWP for the serving cell.

In operation 1e-30, the terminal may perform an RRC connection reconfiguration process (RRC reconfiguration) with the base station to configure a supplementary uplink.

The base station may transmit an RRC connection reconfiguration message (an RRCReconfiguration message) to the terminal. The RRC connection reconfiguration message may include configuration information about a plurality of UL BWPs for a supplementary uplink of one serving cell. For example, UplinkConfig may be included in supplementaryUplink included in ServingCellConfig IE, and a plurality of UL BWPs may be configured in a supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1e-35, the terminal may determine a maximum number of layers for one transport block (TB) for an uplink-shared channel (UL-SCH). The maximum number of layers may be determined by applying at least one of the following methods.

According to an embodiment of the disclosure, when both maxMIMO-Layers of uplinkConfig and maxMIMO-Layers of supplementaryUplink are configured for the serving cell and the two maxMIMO-Layers values are equal to each other, the terminal may apply the MaxMIMO-Layers configured for all UL BWPs of the serving cell as the maximum number of layers (operation 1e-45).

In operation 1e-60, the terminal may perform a PUSCH transmission operation based on the maxMIMO-Layers values applied in operation 1e-45. For example, the terminal may determine a rate matching and a TBS size for PUSCH transmission in the UL BWP by applying the determined maximum number of layers and perform a PUSCH transmission operation.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

According to an embodiment of the disclosure, when both maxMIMO-Layers of uplinkConfig and maxMIMO-Layers of supplementaryUplink are configured for the serving cell and the two maxMIMO-Layers values are different from each other, the terminal may perform an RRC connection re-establishment process with the base station (operation 1e-40).

For example, because the terminal may determine that the maxMIMO-Layers used in the uplink and the maxMIMO-Layers used in the supplementary uplink are always configured as the same value for one serving cell, the terminal may determine that this may not be applied when the maxMIMO-Layers of the uplink and the supplementary are different values (UE is unable to comply with (part of) the configuration included in the RRCReconfiguration message) and may perform an RRC connection re-establishment process with the base station.

According to an embodiment of the disclosure, when only the maxMIMO-Layers value of uplinkConfig is configured or only the maxMIMO-Layers value of supplementaryUplink is configured for the serving cell, the terminal may apply the maxMIMO-Layers value signaled for all UL BWPs of the serving cell as the maximum number of layers (operation 1e-45).

Also, in operation 1e-60, the terminal may perform a PUSCH transmission operation based on the maxMIMO-Layers values applied in operation 1e-45. For example, the terminal may determine a rate matching and a TBS size for PUSCH transmission in the UL BWP by applying the determined maximum number of layers and perform a PUSCH transmission operation.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, in the case of performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

According to an embodiment of the disclosure, when both the maxMIMO-Layers of uplinkConfig and the maxMIMO-Layers of supplementaryUplink are not configured for the serving cell and maxRank is configured for one or more UL BWPs for the uplink or max is configured for one or more UL BWPs for the supplementary uplink (maxRank is signaled/configured in uplinkConfig and/or supplementaryUplink), the terminal may apply the greatest maxRank for all UL BWPs of the serving cell (the maximum value of maxRank across all UL BWPs of the serving cell) as the maximum number of layers (operation 1e-50).

Also, in operation 1e-60, the terminal may perform a PUSCH transmission operation based on the maximum number of layers determined in operation 1e-50. For example, the terminal may perform a PUSCH transmission operation by determining a rate matching and a TBS size for PUSCH transmission in the UL BWP by applying the determined maximum number of layers.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

According to an embodiment of the disclosure, when the maxMIMO-Layers and the maxRank are not configured for the serving cell, the terminal may apply the maximum number of layers supported by the terminal for the serving cell (operation 1e-55).

Also, in operation 1e-60, the terminal may perform a PUSCH transmission operation based on the maxMIMO-Layers values applied in operation 1e-55. For example, the terminal may perform a PUSCH transmission operation by determining a rate matching and a TBS size for PUSCH transmission in the UL BWP by applying the determined maximum number of layers.

According to an embodiment of the disclosure, in the case of performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, in the case of performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of an FBRM for transmitting all parity bits generated by LDPC coding for a particular input, the terminal may determine the TBS size by performing a rate matching based on the number of layers configured for each BWP for the serving cell.

Figure 1F:
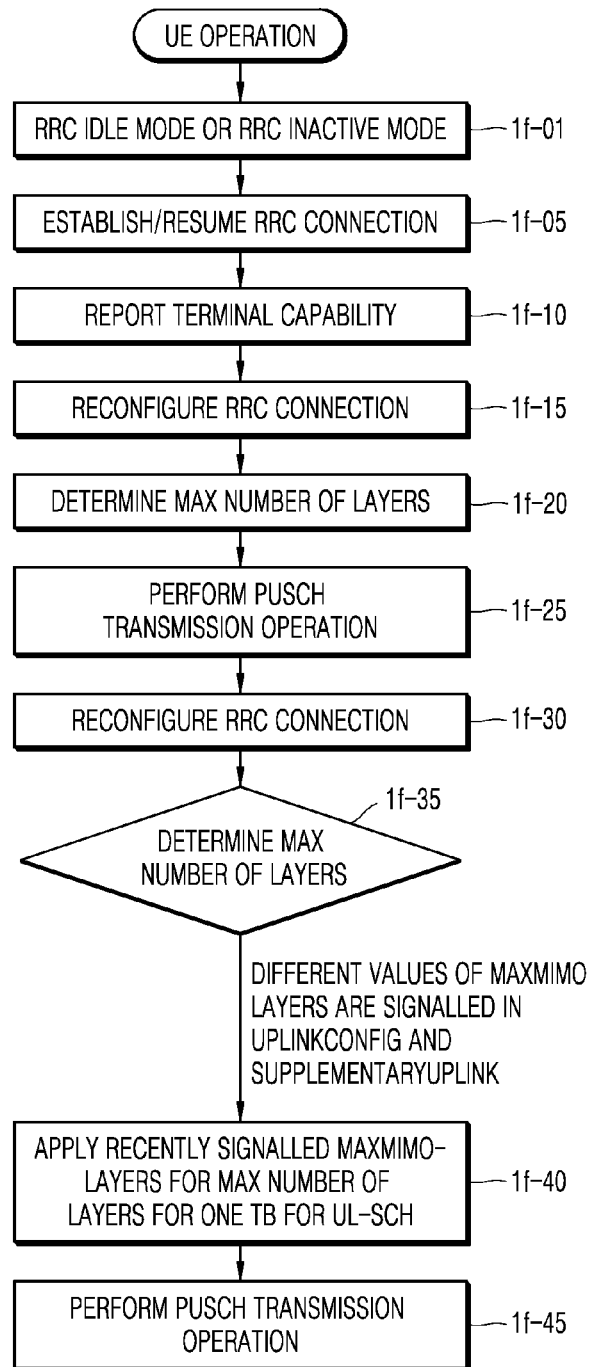
FIG. 1F is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1F is a diagram illustrating a terminal operation for a case where a terminal is configured with an uplink configuration (uplinkConfig) and an additional uplink configuration (supplementaryUplink) from a base station for one serving cell, according to an embodiment of the disclosure. According to various embodiments of the disclosure, at least one of the following operations may be omitted or modified in order to implement embodiments of the disclosure.

Referring to FIG. 1F, the terminal may be in an RRC idle mode or an RRC inactive mode (operation 1f-01).

In operation 1f-05, the terminal in the RRC idle mode or the RRC inactive mode may establish an RRC connection with the base station when data to be transmitted/received occurs afterward. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1f-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for a RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a UE-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1f-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information about at least one UL BWP for an uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for an uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1f-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1*f*-25, the terminal may perform a PUSCH transmission operation. For example, the terminal may perform a PUSCH transmission operation by determining a rate matching and a TBS size for PUSCH transmission in the UL BWP by applying the maximum number of layers determined in operation 1*f*-20.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

In operation 1*f*-30, the terminal may perform an RRC connection reconfiguration process (RRC reconfiguration) with the base station to configure a supplementary uplink. The base station may transmit an RRC connection reconfiguration message (an RRCReconfiguration message) to the terminal. The RRC connection reconfiguration message may include configuration information about at least one UL BWP for a supplementary uplink of one serving cell. For example, UplinkConfig may be included in supplementaryUplink included in ServingCellConfig 1E, and at least one UL BWP may be configured in the supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1*f*-35, the terminal may determine a maximum number of layers for one transport block (TB) for an uplink-shared channel (UL-SCH). According to various embodiments of the disclosure, the maximum number of layers may be determined through at least one of the following methods.

According to an embodiment of the disclosure, when both the maxMIMO-Layers of uplinkConfig and the maxMIMO-Layers of supplementaryUplink are configured for the serving cell and the two maxMIMO-Layers values are different from each other, the terminal may determine that the maxMIMO-Layers used in the uplink and the maxMIMO-Layers used in the supplementary uplink are always configured as the same value. Thus, the terminal may apply the most recently signaled maxMIMO-Layers value for all BWPs of the serving cell as the maximum number of layers. This may be because the most recently signaled maxMIMO-Layers value may best reflect at least one of the current channel state or the terminal state.

In operation 1*f*-45, the terminal may perform a PUSCH transmission operation based on the maxMIMO-Layers value applied in operation 1*f*-40. For example, the terminal may perform a PUSCH transmission operation by determining a rate matching and a TBS size for PUSCH transmission in the UL BWP by applying the determined maximum number of layers.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

Figure 1G:
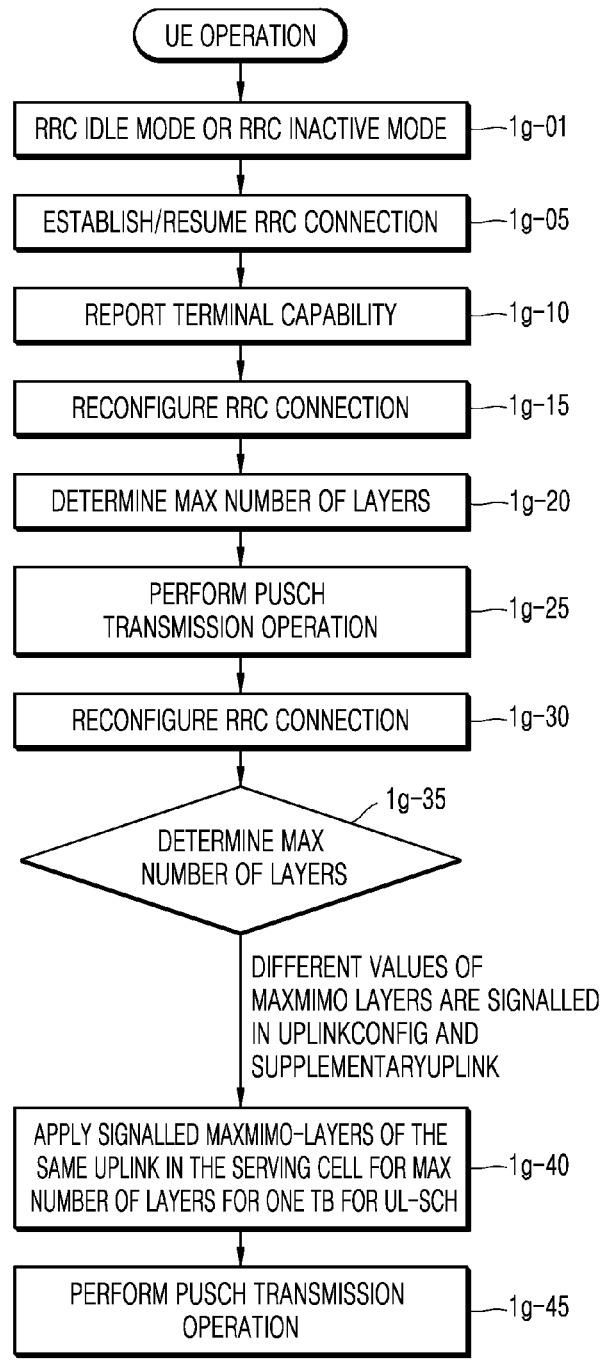
FIG. 1G is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1G is a diagram illustrating a terminal operation for a case where a terminal is configured with an uplink configuration (uplinkConfig) and an additional uplink configuration (supplementaryUplink) from a base station for one serving cell according to an embodiment of the disclosure. According to various embodiments of the disclosure, at least one of the following operations may be omitted or modified in order to implement embodiments of the disclosure.

Referring to FIG. 1G, the terminal may be in an RRC idle mode or an RRC inactive mode (operation 1*g*-01).

In operation 1*g*-05, the terminal in the RRC idle mode or the RRC inactive mode may establish an RRC connection with the base station when data to be transmitted/received occurs afterward. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1*g*-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a UE-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1g-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information about at least one UL BWP for an uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for an uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1g-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1g-25, the terminal may perform a PUSCH transmission operation. For example, the terminal may perform a PUSCH transmission operation by determining a rate matching and a TBS size for PUSCH transmission in the UL BWP by applying the maximum number of layers determined in operation 1g-20.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

In operation 1g-30, the terminal may perform an RRC connection reconfiguration process (RRC reconfiguration) with the base station to configure a supplementary uplink. The base station may transmit an RRC connection reconfiguration message (an RRCReconfiguration message) to the terminal. The RRC connection reconfiguration message may include configuration information about at least one UL BWP for a supplementary uplink of one serving cell. For example, UplinkConfig may be included in supplementaryUplink included in ServingCellConfig 1E, and at least one UL BWP may be configured in the supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1g-35, the terminal may determine a maximum number of layers for one transport block (TB) for an uplink-shared channel (UL-SCH). According to various embodiments of the disclosure, the maximum number of layers may be determined through the following method.

According to an embodiment of the disclosure, when both the maxMIMO-Layers of uplinkConfig and the maxMIMO-Layers of supplementaryUplink are configured for the serving cell and the two maxMIMO-Layers values are different from each other, the terminal may apply the maxMIMO-Layers value signaled in the uplinkConfig for all UL BWPs for the (normal) uplink of the serving cell as the maximum number of layers and apply the maxMIMO-layers value signaled in the supplementaryUplink for all UL BWPs for the supplementary uplink of the serving cell (1g-40 operation).

The (normal) uplink and the supplementary uplink may operate in different frequency bands and the MIMO performance thereof may differ depending on the frequency band thereof. The terminal may transmit information about the different MIMO performances to the base station in UE-NR-Capability. The base station (gNB) may configure the maxMIMO-Layers value differently for the (normal) uplink and the supplementary uplink of the terminal based on the received capability information.

In operation 1g-45, the terminal may perform a PUSCH transmission operation based on the maxMIMO-Layers values respectively applied to the uplink and the supplementary uplink in operation 1g-40. For example, the terminal may determine a rate matching and a TBS size for PUSCH transmission in the UL BWP configured for the (normal) uplink by applying the maximum number of layers determined for the uplink of the serving cell (maxMIMO-Layers in uplinkConfig). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the uplink of the serving cell.

According to an embodiment of the disclosure, the terminal may determine a rate matching and a TBS size for PUSCH transmission in the UL BWP configured for the supplementary uplink by applying the maximum number of layers determined for the supplementary uplink of the serving cell (maxMIMO-Layers in supplementaryUplink). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the supplementary uplink of the serving cell.

Figure 1H:
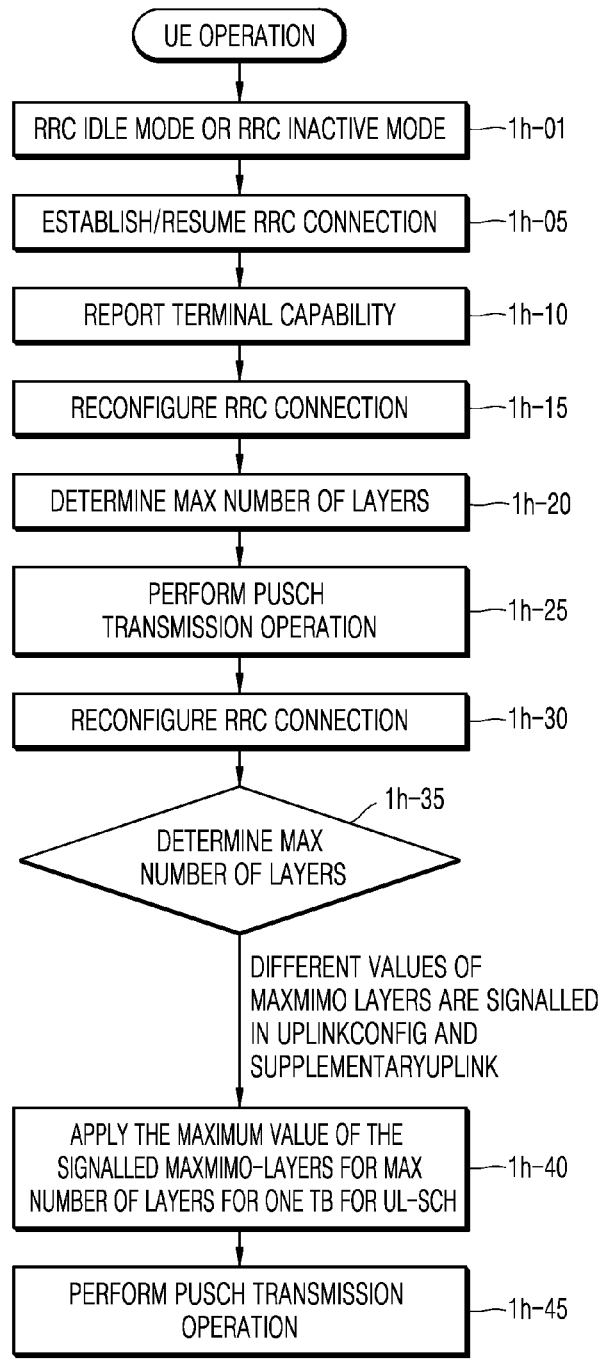
FIG. 1H is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1H is a diagram illustrating a terminal operation for a case where a terminal is configured with an uplink configuration (uplinkConfig) and an additional uplink configuration (supplementaryUplink) from a base station for one serving cell according to an embodiment of the disclosure. According to various embodiments of the disclosure, at least one of the following operations may be omitted or modified in order to implement embodiments of the disclosure.

Referring to FIG. 1H, the terminal may be in an RRC idle mode or an RRC inactive mode (operation 1h-01).

In operation 1h-05, the terminal in the RRC idle mode or the RRC inactive mode may establish an RRC connection with the base station when data to be transmitted/received occurs afterward. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1h-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a UE-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1h-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information about at least one UL BWP for an uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for an uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1h-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1h-25, the terminal may perform a PUSCH transmission operation. For example, the terminal may perform a PUSCH transmission operation by determining a rate matching and a TBS size for PUSCH transmission in the UL BWP by applying the maximum number of layers determined in operation 1h-20.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

In operation 1h-30, the terminal may perform an RRC connection reconfiguration process (RRC reconfiguration) with the base station to configure a supplementary uplink. The base station may transmit an RRC connection reconfiguration message (an RRCReconfiguration message) to the terminal. The RRC connection reconfiguration message may include configuration information about at least one UL BWP for a supplementary uplink of one serving cell. For example, UplinkConfig may be included in supplementaryUplink included in ServingCellConfig 1E, and at least one UL BWP may be configured in the supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1h-35, the terminal may determine a maximum number of layers for one transport block (TB) for an uplink-shared channel (UL-SCH). According to various embodiments of the disclosure, the maximum number of layers may be determined through the following method.

According to an embodiment of the disclosure, when both the maxMIMO-Layers of uplinkConfig and the maxMIMO-Layers of supplementaryUplink are configured for the serving cell and the two maxMIMO-Layers values are different from each other, the terminal may apply the greater value of the maxMIMO-Layers signaled for all UL BWPs of the serving cell as the maximum number of layers. When the greater value of maxMIMO-Layers is applied, there may be an advantage in that the terminal may transmit more data to the base station in one TB. The terminal may apply the greatest value among the maxMIMO-Layers values signaled for all UL BWPs of the serving cell as the maximum number of layers (operation 1h-40).

In operation 1h-45, the terminal may perform a PUSCH transmission operation based on the maxMIMO-Layers value applied in operation 1h-40. For example, the terminal may determine a rate matching and a TBS size for PUSCH transmission in the UL BWP by applying the determined maximum number of layers. The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

Figure 1I:
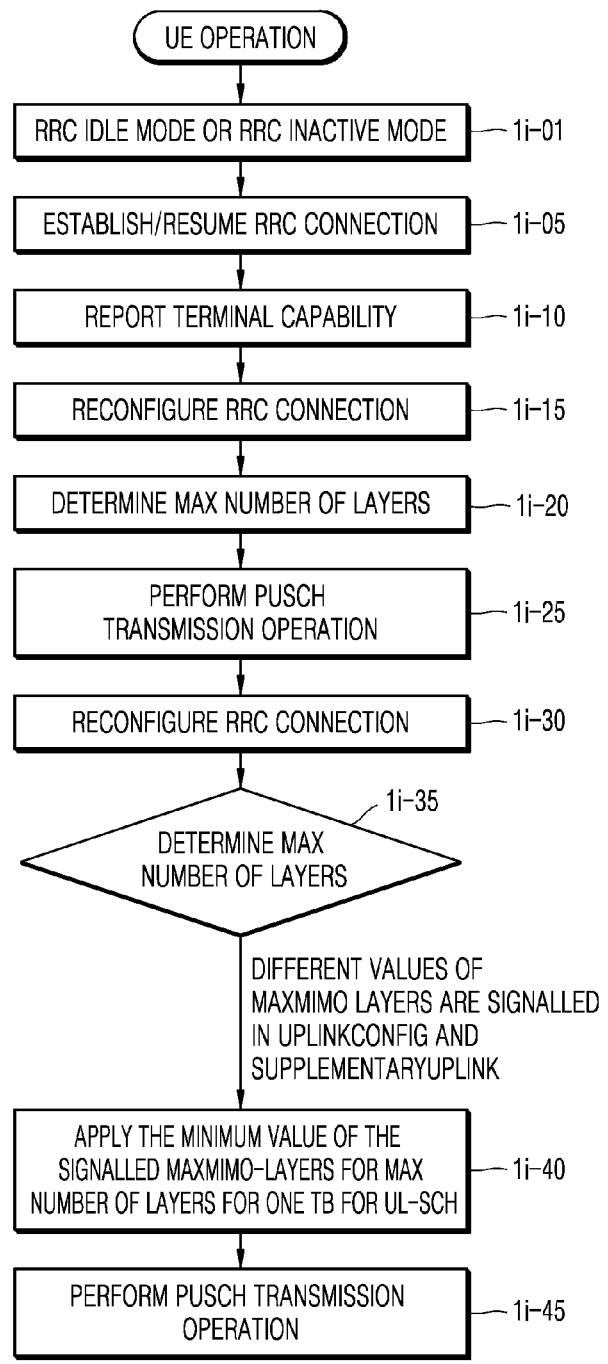
FIG. 1I is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1I is a diagram illustrating a terminal operation for a case where a terminal is configured with an uplink configuration (uplinkConfig) and an additional uplink configuration (supplementaryUplink) from a base station for one serving cell according to an embodiment of the disclosure. According to various embodiments of the disclosure, at least one of the following operations may be omitted or modified in order to implement embodiments of the disclosure.

Referring to FIG. 1I, the terminal may be in an RRC idle mode or an RRC inactive mode (operation 1i-01).

In operation 1i-05, the terminal in the RRC idle mode or the RRC inactive mode may establish an RRC connection with the base station when data to be transmitted/received occurs afterward. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1*i*-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a UE-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1*i*-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information about at least one UL BWP for an uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for an uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1*i*-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1*i*-25, the terminal may perform a PUSCH transmission operation. For example, the terminal may perform a PUSCH transmission operation by determining a rate matching and a TBS size for PUSCH transmission in the UL BWP by applying the maximum number of layers determined in operation 1*i*-20.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

In operation 1*i*-30, the terminal may perform an RRC connection reconfiguration process (RRC reconfiguration) with the base station to configure a supplementary uplink. The base station may transmit an RRC connection reconfiguration message (an RRCReconfiguration message) to the terminal. The RRC connection reconfiguration message may include configuration information about at least one UL BWP for a supplementary uplink of one serving cell. For example, UplinkConfig may be included in supplementaryUplink included in ServingCellConfig IE, and at least one UL BWP may be configured in the supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1*i*-35, the terminal may determine a maximum number of layers for one transport block (TB) for an uplink-shared channel (UL-SCH). According to various embodiments of the disclosure, the maximum number of layers may be determined through the following method.

According to an embodiment of the disclosure, when both the maxMIMO-Layers of uplinkConfig and the maxMIMO-Layers of supplementaryUplink are configured for the serving cell and the two maxMIMO-Layers values are different from each other, the terminal may apply the smaller value among the maxMIMO-Layers values signaled for all UL BWPs of the serving cell as the maximum number of layers. When the smaller value of maxMIMO-Layers is applied, there may be an advantage of increasing the resource efficiency of the terminal and the base station. Also, a method of limiting the maximum number of layers of the terminal may be used as a method of reducing the current consumption. The terminal may apply the smallest value among the maxMIMO-Layers values signaled for all UL BWPs of the serving cell as the maximum number of layers (operation 1$i$-40).

In operation 1$i$-45, the terminal may perform a PUSCH transmission operation based on the maxMIMO-Layers value applied in operation 1$i$-40. For example, the terminal may determine a rate matching and a TBS size for PUSCH transmission in the UL BWP by applying the determined maximum number of layers. The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

Figure 1J:
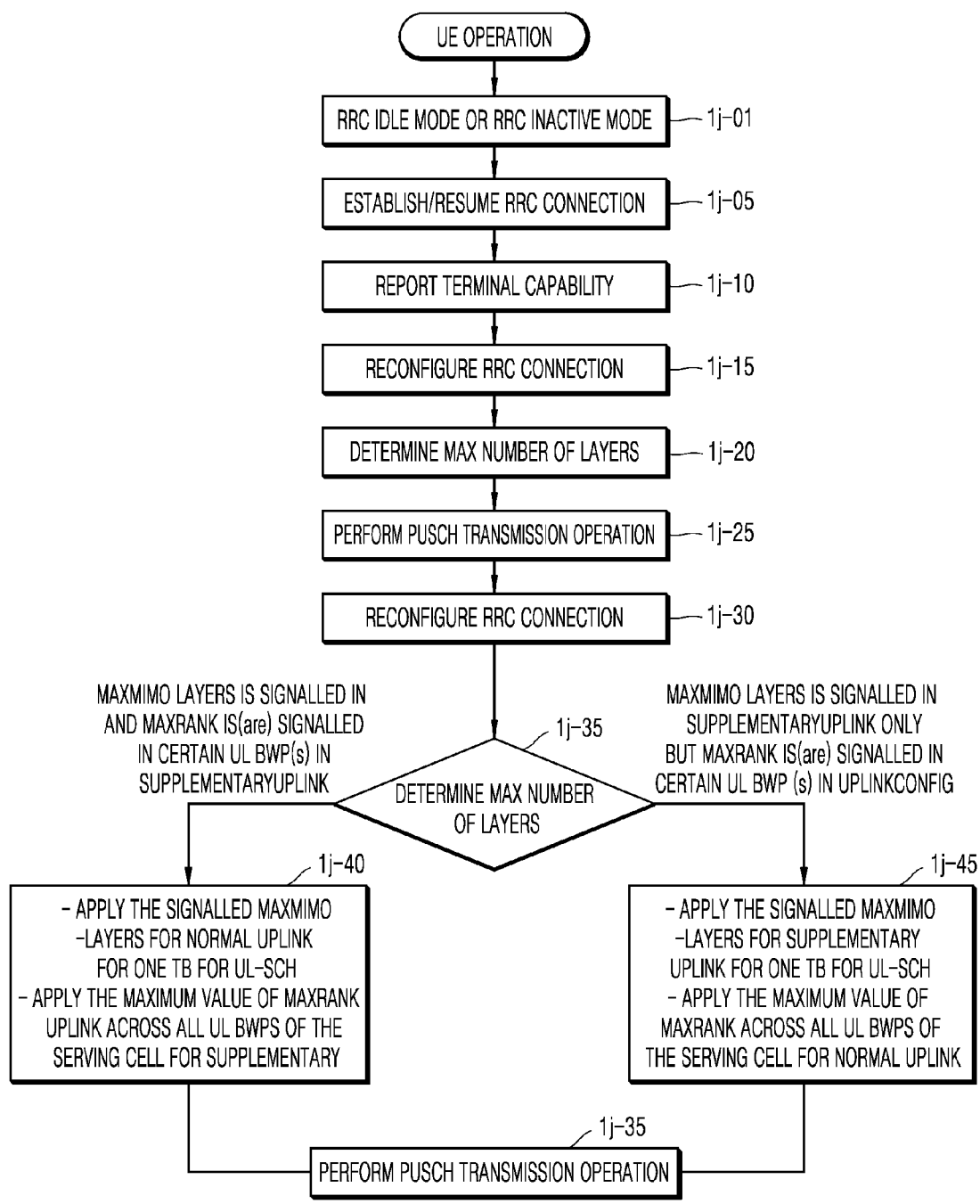
FIG. 1J is a diagram illustrating a terminal operation for a case where a terminal is configured with an uplink configuration (uplinkConfig) and an additional uplink configuration (supplementaryUplink) from a base station for one serving cell according to an embodiment of the disclosure.

FIG. 1J is a diagram illustrating a terminal operation for a case where a terminal is configured with an uplink configuration (uplinkConfig) and an additional uplink configuration (supplementaryUplink) from a base station for one serving cell according to an embodiment of the disclosure. According to various embodiments of the disclosure, at least one of the following operations may be omitted or modified in order to implement embodiments of the disclosure.

Referring to FIG. 1J, the terminal may be in an RRC idle mode or an RRC inactive mode (operation 1$j$-01).

In operation 1$j$-05, the terminal in the RRC idle mode or the RRC inactive mode may establish an RRC connection with the base station when data to be transmitted/received occurs afterward. The terminal in the RRC idle mode may establish an RRC connection with the base station by performing an RRC connection establishment process with the base station. Also, the terminal in the RRC inactive mode may establish an RRC connection with the base station by performing an RRC connection resume process with the base station.

In operation 1$j$-10, the terminal in an RRC connection mode may transmit capability information of the terminal to the base station. According to an embodiment of the disclosure, the base station may request the capability information of the terminal (UE radio access capability information) from the terminal in the RRC connection mode, and the terminal in the RRC connection mode may transmit the capability information of the terminal to the base station.

According to an embodiment of the disclosure, the base station may transmit a UECapabilityEnquiry message (a terminal capability information request message) to the terminal. The UECapabilityEnquiry message may include one or more UE-CapabilityRAT-RequestLists that are terminal capability request lists for RAT. The UE-CapabilityRAT-ReqeustList may include a capability request filter (capabilityRequestFilter) for each RAT type. Alternatively, the UECapabilityEnquiry message may include a UE-CapabilityRequestFilterCommon for requesting a terminal capability filtered in common for all capability containers.

According to an embodiment of the disclosure, the terminal in the RRC connection mode may transmit a terminal capability information message (a UECapabilityInformation message) to the base station based on the UECapabilityEnquiry message received from the base station. The UECapabilityInformation message may include a terminal capability container (a UE-CapabilityRAT-Container) for each RAT for one or more RATs. For example, the terminal capability container for each RAT may include a UE-NR-Capability including terminal radio access capability parameters for NR, and the UE-NR-Capability may include a FeatureSetUplink for the uplink (it is used to indicate the features that the UE supports on the carriers corresponding to one band entry in a band combination). The FeatureSetUplink may include a MIMO-LayersUL for each component carrier or serving cell, that is, for each FeatureSetUplinkPerCC.

In operation 1$j$-15, the terminal may perform an RRC connection reconfiguration process with the base station. The base station may perform an RRC connection reconfiguration process (RRC reconfiguration) with the terminal for normal uplink configuration. The base station may transmit an RRC connection reconfiguration message (an RRCReconfiguration message) to the terminal. The RRC connection reconfiguration message may include configuration information about at least one UL BWP for an uplink of one serving cell. For example, UplinkConfig may be included in uplinkConfig included in ServingCellConfig IE, and at least one UL BWP may be configured in the uplink of one serving cell. Also, maxRank may be configured for each UL BWP (maxRank in PUSCH-Config in BWP-UplinkDedicated in uplinkConfig in ServingCellConfig). The RRC connection reconfiguration message may include a maxMIMO-Layers parameter for an uplink of one serving cell (maxMIMO-Layers in PUSCH-ServingCellConfig in uplinkConfig in ServingCellConfig). Upon receiving the RRC connection reconfiguration message, the terminal may apply the configuration information included in the RRC connection reconfiguration message.

In operation 1$j$-20, the terminal may determine a maximum number of layers for one transport block (TB) for an uplink-shared channel (UL-SCH). The maximum number of layers may be determined through the following method.

When maxMIMO-Layers are configured for the serving cell (maxMIMO-Layers in PUSCH-ServingCellConfig in uplinkConfig in ServingCellConfig), the terminal may apply the maxMIMO-Layers configured for all UL BWPs of the serving cell as the maximum number of layers.

When maxMIMO-Layers are not configured for the serving cell and maxRank is configured for one or more UL BWPs, the terminal may apply the greatest maxRank for all UL BWPs of the serving cell (the maximum value of maxRank across all UL BWPs of the serving cell) as the maximum number of layers.

When maxMIMO-Layers and maxRank are not configured for the serving cell, the terminal may apply the maximum number of layers supported by the terminal for the serving cell for a PUSCH transmission operation as the maximum number of layers.

In operation 1*j*-25, the terminal may perform a PUSCH transmission operation. For example, the terminal may perform a PUSCH transmission operation by determining a rate matching and a TBS size for PUSCH transmission in the UL BWP by applying the maximum number of layers determined in operation 1*j*-20.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the serving cell.

In operation 1*j*-30, the terminal may perform an RRC connection reconfiguration process (RRC reconfiguration) with the base station to configure a supplementary uplink. The base station may transmit an RRC connection reconfiguration message (an RRCReconfiguration message) to the terminal. The RRC connection reconfiguration message may include configuration information about at least one UL BWP for a supplementary uplink of one serving cell. For example, UplinkConfig may be included in supplementaryUplink included in ServingCellConfig 1E, and at least one UL BWP may be configured in the supplementary uplink of one serving cell. Also, maxRank may be configured for each UL BWP (maxRank in PUSCH-Config in BWP-UplinkDedicated in supplementaryUplink in ServingCellConfig). The RRC connection reconfiguration message may include a maxMIMO-Layers parameter for a supplementary uplink of one serving cell (maxMIMO-Layers in PUSCH-ServingCellConfig in supplementaryUplink in ServingCellConfig). Upon receiving the RRC connection reconfiguration message, the terminal may apply the configuration information included in the RRC connection reconfiguration message.

In operation 1*j*-35, the terminal may determine a maximum number of layers for one transport block (TB) for an uplink-shared channel (UL-SCH). According to various embodiments of the disclosure, the maximum number of layers may be determined by applying at least one of the following methods.

According to an embodiment of the disclosure, when the maxMIMO-Layers is configured in the uplinkConfig and the maxMIMO-Layers is not configured in the supplementaryUplink for the serving cell but the maxRank is configured for one or more (supplementary) UL BWPs for the supplementaryUplink, the terminal may apply the maxMIMO-Layers value signaled in the uplinkConfig as the maximum number of layers for all UL BWPs for the (normal) uplink of the serving cell and apply the greatest maxRank among the maxRank values of the (supplementary) UL BWPs signaled in the supplementaryUplink as the maximum number of layers for all UL BWPs for the supplementary uplink of the serving cell (operation 1*j*-40).

In operation 1*j*-50, the terminal may perform a PUSCH transmission operation based on the maxMIMO-Layers value applied to the uplink of the serving cell and the maxRank applied to the supplementary uplink in operation 1*j*-40. For example, the terminal may determine a rate matching and a TBS size for PUSCH transmission in the UL BWP operating in the normal uplink by applying the maximum number of layers determined for the uplink of the serving cell (maxMIMO-Layers in uplinkConfig). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the uplink of the serving cell.

According to an embodiment of the disclosure, the terminal may determine a rate matching and a TBS size for PUSCH transmission in the UL BWP operating in the supplementary uplink by applying the maximum number of layers determined for the supplementary uplink of the serving cell (the maximum value of maxRank across all UL BWPs in supplementaryUplink). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the supplementary uplink of the serving cell.

According to an embodiment of the disclosure, when the maxMIMO-Layers is configured in the supplementaryUplink and the maxMIMO-Layers is not configured in the uplinkConfig for the serving cell but the maxRank is configured for one or more (normal) UL BWPs for the normal uplink, the terminal may apply the maxMIMO-Layers value signaled in the supplementaryUplink as the maximum number of layers for all UL BWPs for the supplementary uplink of the serving cell and apply the greatest maxRank among the maxRank values for the (normal) UL BWPs signaled in the uplinkConfig as the maximum number of layers for all UL BWPs for the (normal) uplink of the serving cell (operation 1j-45).

In operation 1j-50, the terminal may perform a PUSCH transmission operation based on the maxMIMO-Layers value applied to the supplementary uplink of the serving cell and the maxRank applied to the (normal) uplink in operation 1j-45. For example, the terminal may determine a rate matching and a TBS size for PUSCH transmission in the UL BWP configured for the supplementary uplink by applying the maximum number of layers determined for the supplementary uplink of the serving cell (maxMIMO-Layers in supplementaryUplink). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the supplementary uplink of the serving cell.

According to an embodiment of the disclosure, the terminal may determine a rate matching and a TBS size for PUSCH transmission in the UL BWP configured in the (normal) uplink by applying the maximum number of layers determined for the (normal) uplink of the serving cell (the maximum value of maxRank across all UL BWPs in uplinkConfig). The terminal may perform a PUSCH transmission operation based on the determined rate matching and TBS size.

According to an embodiment of the disclosure, when performing an LBRM, which limits the number of parity bits that may be transmitted among all parity bits generated by LDPC coding for a particular input, the terminal may determine the TBS size by performing a rate matching by applying the determined maximum number of layers.

According to an embodiment of the disclosure, when performing an LBRM, which limits the number of parity bits that may be transmitted among all parity bits generated by LDPC coding for a particular input, the terminal may determine the size of the buffer of the LBRM by applying the determined maximum number of layers.

According to an embodiment of the disclosure, in the case of performing an FBRM for transmitting all parity bits generated by LDPC coding for a particular input, the terminal may determine the TBS size by performing a rate matching based on the number of layers configured for each BWP for the (normal) uplink of the serving cell.

Figure 1K:
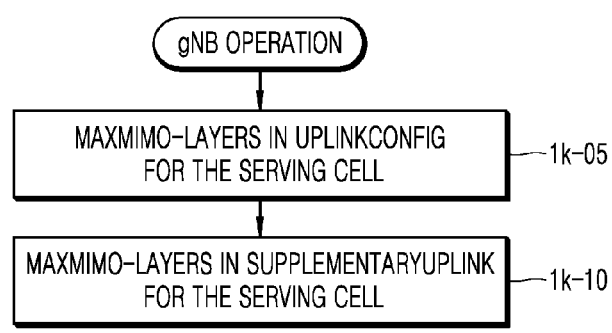
FIG. 1K is a diagram illustrating a method of signaling maxMIMO-Layers when a base station configures an uplink configuration (uplinkConfig) and an additional uplink configuration (supplementaryUplink) to a Radio Resource Control (RRC) connection mode terminal for one serving cell according to an embodiment of the disclosure.

FIG. 1K is a diagram illustrating a method of signaling maxMIMO-Layers when a base station configures an uplink configuration (uplinkConfig) and an additional uplink configuration (supplementaryUplink) to an RRC connection mode terminal for one serving cell according to an embodiment of the disclosure.

Referring to FIG. 1K, the base station may transmit an uplinkConfig in an RRCReconfiguration message through an RRC connection reconfiguration process to configure a normal uplink to the RRC connection mode terminal. In this case, maxMIMO-Layers may be signaled to the terminal through the uplinkConfig for one serving cell (operation 1k-05).

The base station may transmit a supplementaryUplink in an RRCReconfiguration message to the terminal in the RRC connection mode through an RRC connection reconfiguration process in order to configure a supplementary uplink for the serving cell. When the base station signals the maxMIMO-Layers in the uplinkConfig for the serving cell to the terminal in operation 1k-05, the base station may signal a value equal to the maxMIMO-Layers signaled in operation 1k-05 in the supplementaryUplink. Alternatively, when the base station signals the maxMIMO-Layers in the uplinkConfig for the serving cell to the terminal in operation 1k-05, the base station may signal a value different from the maxMIMO-Layers signaled in operation 1k-05 in the supplementaryUplink (operation 1k-10).

Figure 1L:
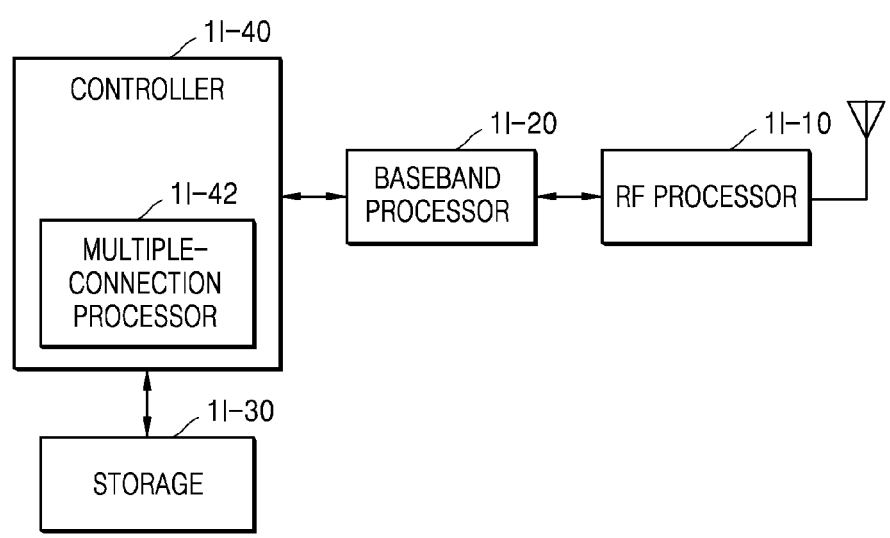
FIG. 1L is a diagram illustrating a structure of a terminal according to an embodiment of the disclosure.

FIG. 1L is a diagram illustrating a structure of a terminal according to an embodiment of the disclosure.

Referring to FIG. 1L, the terminal may include a radio frequency (RF) processor 1l-10, a baseband processor 1l-20, a storage 1l-30, and a controller 1l-40.

According to an embodiment of the disclosure, the RF processor 1l-10 may perform functions for transmitting or receiving signals through wireless channels, such as band conversion and amplification of signals. That is, the RF processor 1l-10 may up-convert a baseband signal provided from the baseband processor 1l-20 into an RF band signal and transmit the same through an antenna and may down-convert an RF band signal received through the antenna into a baseband signal. For example, the RF processor 1l-10 may include a transmission filter, a reception filter, an amplifier, a mixer, an oscillator, a digital-to-analog converter (DAC), and an analog-to-digital converter (ADC). Although only one antenna is illustrated in FIG. 1L, the terminal may include a plurality of antennas.

Also, the RF processor 1l-10 may include a plurality of RF chains. In addition, the RF processor 1l-10 may perform beamforming. For beamforming, the RF processor 1l-10 may adjust the phase and magnitude of each of the signals transmitted or received through a plurality of antennas or antenna elements. Also, the RF processor may perform multiple-input and multiple-output (MIMO) and may receive multiple layers when performing a MIMO operation. Under the control of the controller, the RF processor 1l-10 may perform reception beam sweeping by suitably configuring a plurality of antennas or antenna elements or may adjust the direction and width of a reception beam so that the reception beam may be coordinated with a transmission beam.

The baseband processor 1l-20 may perform a conversion function between a baseband signal and a bitstream according to the physical layer standard of the system. For example, during data transmission, the baseband processor 1l-20 may generate complex symbols by encoding and modulating a transmission bitstream. Also, during data reception, the baseband processor 1l-20 may restore a reception bitstream by demodulating and decoding the baseband signal provided from the RF processor 1*l*-10. For example, according to an OFDM scheme, during data transmission, the baseband processor 1*l*-20 may generate complex symbols by encoding and modulating a transmission bitstream, map the complex symbols to subcarriers, and then configure OFDM symbols through an inverse fast Fourier transform (IFFT) operation and cyclic prefix (CP) insertion. Also, during data reception, the baseband processor 1*l*-20 may divide the baseband signal provided from the RF processor 1*l*-10 into OFDM symbol units, restore signals mapped to the subcarriers through a fast Fourier transform (FFT) operation, and then restore a reception bitstream through demodulation and decoding.

The baseband processor 1*l*-20 and the RF processor 1*l*-10 may transmit and receive signals as described above. Accordingly, the baseband processor 1*l*-20 and the RF processor 1*l*-10 may be referred to as a transmitter, a receiver, a transceiver, or a communicator. In addition, at least one of the baseband processor 1*l*-20 or the RF processor 1*l*-10 may include a plurality of communication modules to support a plurality of different radio access technologies. Also, at least one of the baseband processor 1*l*-20 or the RF processor 1*l*-10 may include a plurality of communication modules to process signals of different frequency bands. For example, the different radio access technologies may include LTE networks, NR networks, and the like. Also, the different frequency bands may include a super high frequency (SHF) (e.g., 2.2 GHz or 2 GHz) band and a millimeter wave (e.g., 60 GHz) band.

The storage 1*l*-30 may store data such as a basic program, an application program, or configuration information for operation of the terminal. The storage 1*l*-30 may provide the stored data at the request of the controller 1*l*-40.

The controller 1*l*-40 may control overall operations of the terminal. For example, the controller 1*l*-40 may transmit/receive signals through the baseband processor 1*l*-20 and the RF processor 1*l*-10. Also, the controller 1*l*-40 may write/read data into/from the storage 1*l*-30. For this purpose, the controller 1*l*-40 may include at least one processor. For example, the controller 1*l*-40 may include a communication processor (CP) 1*l*-42 for performing control for communication and an application processor (AP) for controlling an upper layer such as an application program.

Figure 1M:
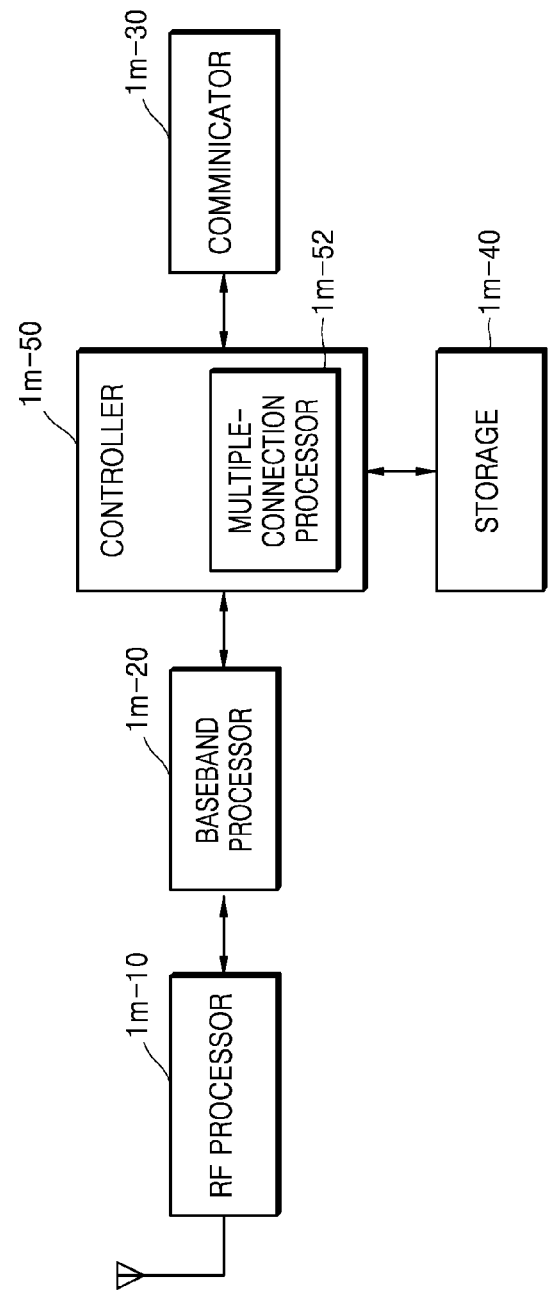
FIG. 1M is a diagram illustrating a structure of a base station according to an embodiment of the disclosure.

FIG. 1M is a diagram illustrating a structure of a base station according to an embodiment of the disclosure.

Referring to FIG. 1M, the base station may include one or more transmission reception points (TRPs).

According to an embodiment of the disclosure, the base station may include an RF processor 1*m*-10, a baseband processor 1*m*-20, a backhaul communicator 1*m*-30, a storage 1*m*-40, and a controller 1*m*-50.

The RF processor 1*m*-10 may perform functions for transmitting or receiving signals through wireless channels, such as band conversion and amplification of signals. That is, the RF processor 1*m*-10 may up-convert a baseband signal provided from the baseband processor 1*m*-20 into an RF band signal and transmit the same through an antenna and may down-convert an RF band signal received through the antenna into a baseband signal. For example, the RF processor 1*m*-10 may include a transmission filter, a reception filter, an amplifier, a mixer, an oscillator, a DAC, and an ADC. Although only one antenna is illustrated in FIG. 1M, the base station may include a plurality of antennas.

Also, the RF processor 1*m*-10 may include a plurality of RF chains. In addition, the RF processor 1*m*-10 may perform beamforming. For beamforming, the RF processor 1*m*-10 may adjust the phase and magnitude of each of the signals transmitted/received through a plurality of antennas or antenna elements. The RF processor may perform a downlink MIMO operation by transmitting one or more layers.

The baseband processor 1*m*-20 may perform a conversion function between a baseband signal and a bitstream according to the physical layer standard of a first radio access technology. For example, during data transmission, the baseband processor 1*m*-20 may generate complex symbols by encoding and modulating a transmission bitstream. Also, during data reception, the baseband processor 1*m*-20 may restore a reception bitstream by demodulating and decoding the baseband signal provided from the RF processor 1*m*-10. For example, according to the OFDM scheme, during data transmission, the baseband processor 1*m*-20 may generate complex symbols by encoding and modulating a transmission bitstream, map the complex symbols to subcarriers, and then configure OFDM symbols through an IFFT operation and CP insertion. Also, during data reception, the baseband processor 1*m*-20 may divide the baseband signal provided from the RF processor 1*m*-10 into OFDM symbol units, restore signals mapped to the subcarriers through an FFT operation, and then restore a reception bitstream through demodulation and decoding.

The baseband processor 1*m*-20 and the RF processor 1*m*-10 may transmit and receive signals as described above. Accordingly, the baseband processor 1*m*-20 and the RF processor 1*m*-10 may be referred to as a transmitter, a receiver, a transceiver, a communicator, or a wireless communicator.

The backhaul communicator 1*m*-30 may provide an interface for communicating with other nodes in the network.

The storage 1*m*-40 may store data such as a basic program, an application program, or configuration information for operation of the main base station. Particularly, the storage 1*m*-40 may store information about a bearer allocated to a connected terminal, a measurement result reported from the connected terminal, or the like. Also, the storage 1*m*-40 may store information that is a reference for determining whether to provide or terminate multiple connections to the terminal. The storage 1*m*-40 may provide the stored data at the request of the controller 1*m*-50.

The controller 1*m*-50 may control overall operations of the main base station. For example, the controller 1*m*-50 may transmit/receive signals through the baseband processor 1*m*-20 and the RF processor 1*m*-10 or through the backhaul communicator 1*m*-30. Also, the controller 1*m*-50 may write/read data into/from the storage 1*m*-40. For this purpose, the controller 1*m*-50 may include at least one processor 1*m*-52. The baseband processor 1*m*-20 and the RF processor 1*m*-10 may be referred to as a transmitter, a receiver, a transceiver, a communicator, or a wireless communicator.

Figure 1N:
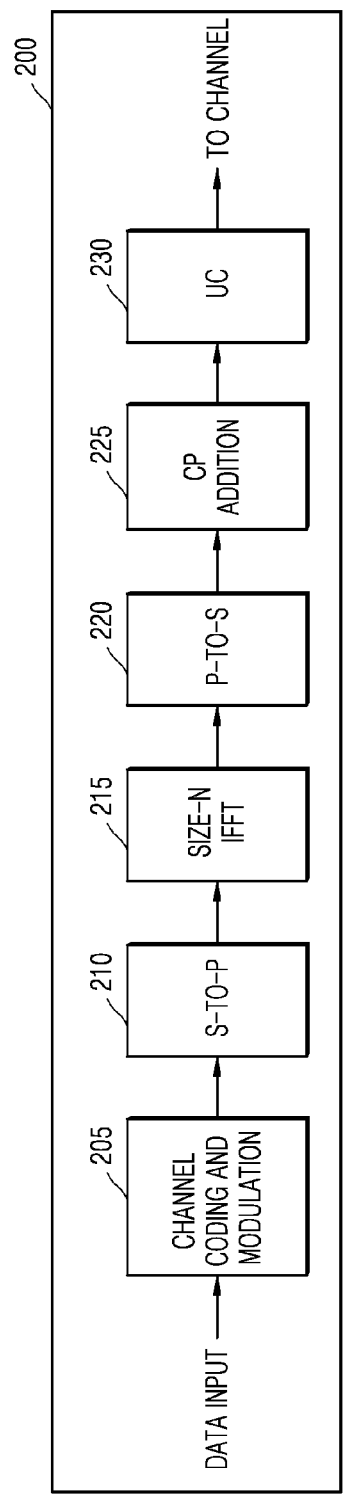
FIG. 1N is a diagram illustrating an example of wireless transmission and reception paths according to an embodiment of the disclosure.
Figure 10:
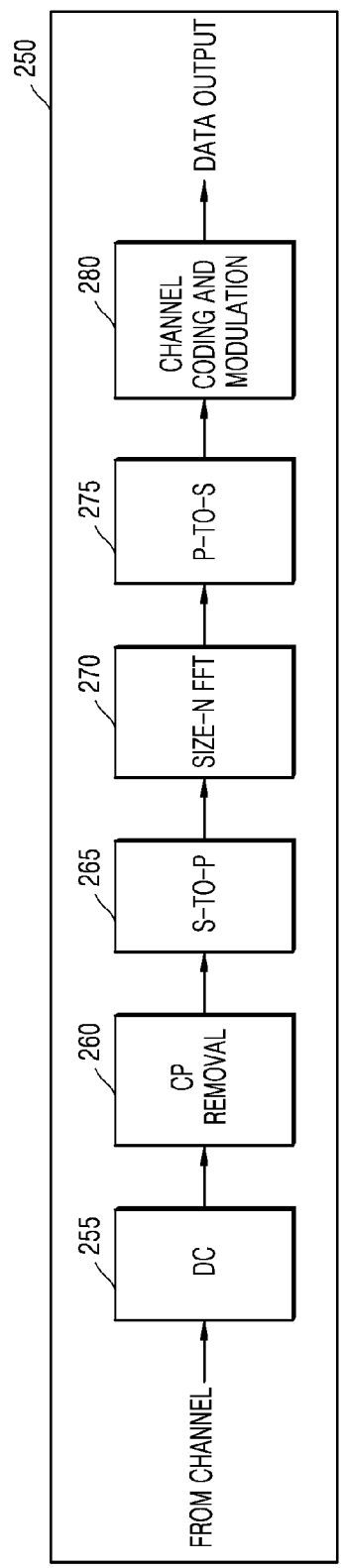

FIGS. 1N and 1O are diagrams illustrating an example of wireless transmission and reception paths according to various embodiments of the disclosure.

Referring to FIGS. 1N and 1O, a transmission path 200 may be described as being implemented in the terminal, and a reception path 250 may be described as being implemented in the base station (gNB). However, the reception path 250 may be implemented in the terminal, and the transmission path 200 may be implemented in the base station. According to an embodiment of the disclosure, the reception path 250 may be configured to receive one or two codewords depending on the number of layers transmitted, as described in embodiments of the disclosure.

The transmission path 200 may include a channel coding and modulation block 205, a serial-to-parallel (S-to-P) block 210, a size N inverse fast Fourier transform (IFFT) block 215, a parallel-to-Serial (P-to-S) block 220, a cyclic prefix (CP) addition block 225, and an up-converter (UC) 230. The reception path 250 may include a down-converter (DC) 255, a CP removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 may receive a set of information bits, apply coding (e.g., convolutional, turbo, polar, or LDPC coding), and modulate the input bits (e.g., quadrature phase shift keying (QPSK) or quadrature amplitude modulation (QAM)) to generate a sequence of frequency domain modulation symbols. The serial-to-parallel block 210 may convert (e.g., demultiplex) the serially modulated symbols into parallel data to generate N parallel symbol streams, where N is an IFFT/FFT size used in the base station and the terminal. The size N IFFT block 215 may perform an IFFT operation on the N parallel symbol streams to generate time-domain output signals. The parallel-to-serial block 220 may convert (e.g., multiplex) the parallel time-domain output symbols from the size N IFFT block 215 to generate a serial time-domain signal. The CP addition block 225 may insert a CP into the time-domain signal. The up-converter 230 may modulate (e.g., up-convert) the output of the CP addition block 225 to an RF frequency for transmission on a radio channel. Also, this signal may be filtered in the baseband before conversion to the RF frequency.

The RF signal transmitted from the terminals may arrive at the base station after passing through the radio channel, and inverse operations for the operations in the terminal may be performed in the base station. The down-converter 255 may down-convert the received signal to a baseband frequency, and the CP removal block 260 may remove the CP to generate a serial time-domain baseband signal. The serial-to-parallel block 265 may convert the time-domain baseband signal into parallel time-domain signals. The size N FFT block 270 may perform an FFT algorithm to generate N parallel frequency domain signals. The parallel-to-serial block 275 may convert the parallel frequency-domain signals into a sequence of modulated data symbols. The channel decoding and demodulation block 280 may restore an original input data stream by demodulating the modulated symbols and then decoding the results thereof.

As described below in more detail, the transmission path 200 or the reception path 250 may perform signaling for multistream transmission. Each of the base stations may implement the transmission path 200 similar to the downlink transmission to the terminals or may implement the reception path 250 similar to the uplink reception from the terminals. Similarly, each of the terminals may implement the transmission path 200 similar to the uplink transmission to the base stations or may implement the reception path 250 similar to the downlink reception from the base stations.

Each of the components in FIGS. 1N and 1O may be implemented by using only hardware or by using a combination of hardware and software/firmware. As a particular example, at least some of the components in FIGS. 1N and 1O may be implemented by software, while other components may be implemented by configurable hardware or a mixture of software and configurable hardware. For example, the FFT block 270 and the IFFT block 215 may be implemented as configurable software algorithms, where the value of the size N may vary according to the implementation thereof.

Also, although it has been described that the FFT and the IFFT are used, this is merely for illustrative purposes and should not be construed as limiting the scope of the disclosure. Other types of modifications such as discrete Fourier transform (DFT) functions and inverse discrete Fourier transform (IDFT) functions may be used. As for DFT and IDFT functions, the value of a variable N may be any integer (e.g., 1, 2, 3, or 4), and as for FFT and IFFT functions, the value of a variable N may be any integer that is the power of 2 (e.g., 1, 2, 4, 8, or 16).

Although FIGS. 1N and 1O illustrate examples of wireless transmission and reception paths, various modifications may be made in FIGS. 1N and 1O. For example, various components in FIGS. 1N and 1O may be combined, further subdivided, or omitted, and additional components may be added according to particular needs. Also, FIGS. 1N and 1O are to describe examples of types of transmission and reception paths that may be used in wireless networks. Any other suitable architectures may be used to support wireless communications in wireless networks.

FIG. 1P is a diagram illustrating an example embodiment for a bit-level and a symbol-level processing of a terminal or a base station according to an embodiment of the disclosure.

Referring to FIG. 1P, bit-level and symbol-level processing may be described in an embodiment 1100 of FIG. 1P. A transport block (TB) 1101 may be processed by a series of bit-level operations 1102 including at least one of code block (CB) segmentation 1103, channel coding, rate matching, or channel interleaver (only for UL). The output of bit-level processing 1104 associated with one TB and one CW may be processed by a series of symbol-level operations 1105 including at least one of modulation mapping, layer mapping 1106, precoding, or RE mapping.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
   transmitting, to a base station, capability information including a first maximum number of multiple-input and multiple output (MIMO) layers of a first carrier and a second maximum number of MIMO layers of a second carrier uplink, wherein the first carrier is different from the second carrier;
   receiving, from the base station, a radio resource control (RRC) message including configuration information for a normal uplink including a third maximum number of MIMO layers and information related to a bandwidth part (BWP) of the normal uplink;
   in case that the RRC message includes configuration information for a supplementary uplink, identifying a fourth maximum number of MIMO layers for the supplementary uplink based on the configuration information for the supplementary uplink, the configuration information for the supplementary uplink including the fourth maximum number of MIMO layers and information related on BWP of the supplementary uplink; and
   transmitting, to the base station, a physical uplink shared channel (PUSCH) using one of the normal uplink and the supplementary uplink,
   wherein the normal uplink is using the first carrier and the supplementary uplink is using the second carrier, and
   wherein the normal uplink is configured based on the third maximum number of MIMO layers and the information related on BWP of the normal uplink, and the supplementary uplink is configured based on the fourth maximum number of MIMO layers and the information related on BWP of the supplementary uplink.

2. The method of claim 1, further comprising identifying the third maximum number of MIMO layers for the normal uplink, based on the configuration information for the normal uplink.

3. The method of claim 1, wherein the identifying of the fourth maximum number of MIMO layers comprises, in case that maximum MIMO layers information and maximum rank information are not configured in the configuration information for the supplementary uplink, identifying the maximum number of layers for the PUSCH supported by the terminal for a serving cell to be the fourth maximum number of MIMO layers for the BWP of the supplementary uplink.

4. The method of claim 1, wherein the configuration information for the normal uplink and the configuration information for the supplementary uplink are for a serving cell.

5. A terminal in a wireless communication system, the terminal comprising:
   a transceiver; and
   at least one controller configured to:
      transmit, to a base station, capability information including a first maximum number of multiple-input and multiple output (MIMO) layers of a first carrier and a second maximum number of MIMO layers of a second carrier uplink, wherein the first carrier is different from the second carrier,
      receive, from the base station, a radio resource control (RRC) message including configuration information for a normal uplink including a third maximum number of MIMO layers and information related to a bandwidth part (BWP) of the normal uplink,
      in case that the RRC message includes configuration information for a supplementary uplink including, identify a fourth maximum number of MIMO layers for the supplementary uplink based on the configuration information for the supplementary uplink, the configuration information for the supplementary uplink including the fourth maximum number of MIMO layers and information related on BWP of the supplementary uplink, and
      transmit, to the base station, a physical uplink shared channel (PUSCH) using one of the normal uplink and the supplementary uplink,
   wherein the normal uplink is configured based on the third maximum number of MIMO layers and the information related on BWP of the normal uplink, and the supplementary uplink is configured based on the fourth maximum number of MIMO layers and the information related on BWP of the supplementary uplink.

6. The terminal of claim 5, wherein the at least one controller further configured to identify the third maximum number of MIMO layers for the normal uplink, based on the configuration information for the normal uplink.

7. The terminal of claim 5, wherein the at least one controller is further configured to, in case that maximum MIMO layers information and maximum rank information are not configured in the configuration information for the supplementary uplink, identify the maximum number of layers for the PUSCH supported by the terminal for a serving cell to be the second maximum number of MIMO layers for the BWP of the supplementary uplink.

8. The terminal of claim 5, wherein the configuration information for the normal uplink and the configuration information for the supplementary uplink are for a serving cell.

* * * * *